United States Patent
Guendogdu et al.

(10) Patent No.: US 9,745,850 B2
(45) Date of Patent: Aug. 29, 2017

(54) BLADE CASCADE AND CONTINUOUS-FLOW MACHINE

(71) Applicant: MTU Aero Engines AG, Munich (DE)

(72) Inventors: Yavuz Guendogdu, Munich (DE); Jochen Gier, Karlsfeld (DE); Karl Engel, Dachau (DE)

(73) Assignee: MTU Aero Engines AG, Munich (DE)

( * ) Notice: Subject to any disclaimer, the term of this patent is extended or adjusted under 35 U.S.C. 154(b) by 416 days.

(21) Appl. No.: 14/286,584

(22) Filed: May 23, 2014

(65) Prior Publication Data
US 2014/0348660 A1    Nov. 27, 2014

(30) Foreign Application Priority Data

May 24, 2013  (EP) ..................... 13169056

(51) Int. Cl.
F01D 5/14    (2006.01)

(52) U.S. Cl.
CPC ............. *F01D 5/145* (2013.01); *F01D 5/143* (2013.01); *F01D 5/146* (2013.01); *F05D 2240/301* (2013.01); *F05D 2240/305* (2013.01); *F05D 2240/306* (2013.01); *Y02T 50/673* (2013.01)

(58) Field of Classification Search
CPC .......... F01D 5/143; F01D 5/145; F01D 5/146; F01D 2240/301; F01D 2240/305; F01D 2240/306; Y02T 50/673
See application file for complete search history.

(56) References Cited

U.S. PATENT DOCUMENTS

| | | | | |
|---|---|---|---|---|
| 3,039,736 A | * | 6/1962 | Pon | F01D 5/145 415/195 |
| 6,213,711 B1 | * | 4/2001 | Muller | F01D 5/145 415/191 |
| 8,727,716 B2 | * | 5/2014 | Clements | F01D 9/02 415/191 |
| 2003/0170124 A1 | * | 9/2003 | Staubach | F01D 5/142 416/193 A |
| 2008/0095614 A1 | * | 4/2008 | Aubin | F01D 5/143 415/144 |
| 2009/0202358 A1 | * | 8/2009 | Grohens | F01D 5/143 416/97 R |

(Continued)

FOREIGN PATENT DOCUMENTS

| | | |
|---|---|---|
| EP | 2 088 286 A1 | 8/2009 |
| EP | 2 194 232 A2 | 6/2010 |

(Continued)

OTHER PUBLICATIONS

European Search Report dated Jul. 30, 2013, with Statement of Relevancy (Seven (7) pages).

*Primary Examiner* — Atif Chaudry
(74) *Attorney, Agent, or Firm* — Crowell & Moring LLP

(57) ABSTRACT

A blade cascade of a continuous-flow machine is disclosed. The blade cascade has at least one side wall that is constructed in a wave-like manner in the peripheral direction and has at least one elevation and at least one depression. At least a profile-like rib is integrated in or combined with the side wall, which has a blade profile with a pressure side and with an opposite suction side. A continuous-flow machine with such a blade cascade is also disclosed.

11 Claims, 3 Drawing Sheets

(56) References Cited

U.S. PATENT DOCUMENTS

| | | | |
|---|---|---|---|
| 2010/0143140 A1* | 6/2010 | Guemmer | F01D 5/143 416/193 A |
| 2010/0172749 A1* | 7/2010 | Mitsuhashi | F01D 5/143 415/193 |
| 2010/0303627 A1* | 12/2010 | Megerle | F01D 5/143 416/179 |
| 2011/0044818 A1 | 2/2011 | Kuhne et al. | |
| 2012/0251324 A1* | 10/2012 | Johann | F01D 5/34 416/204 A |
| 2013/0108424 A1* | 5/2013 | Stein | F01D 5/145 415/183 |

FOREIGN PATENT DOCUMENTS

| | | |
|---|---|---|
| EP | 2 261 462 A1 | 12/2010 |
| WO | WO 98/44240 A1 | 10/1998 |
| WO | WO 2013/009449 A1 | 1/2013 |

* cited by examiner

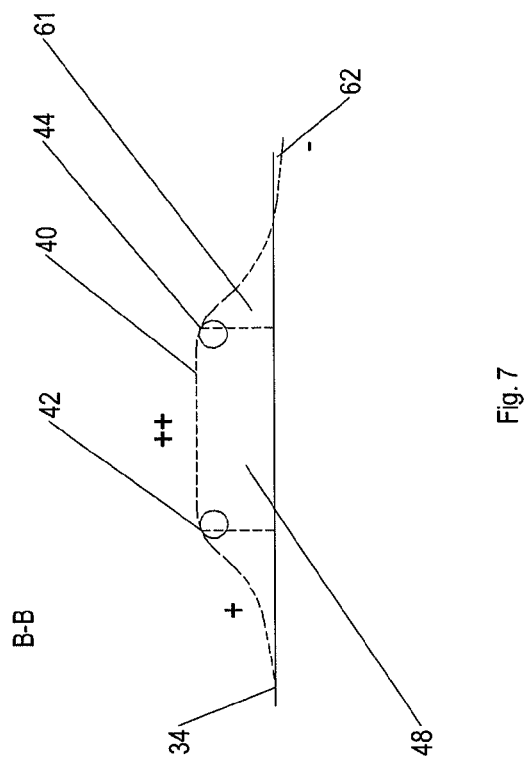
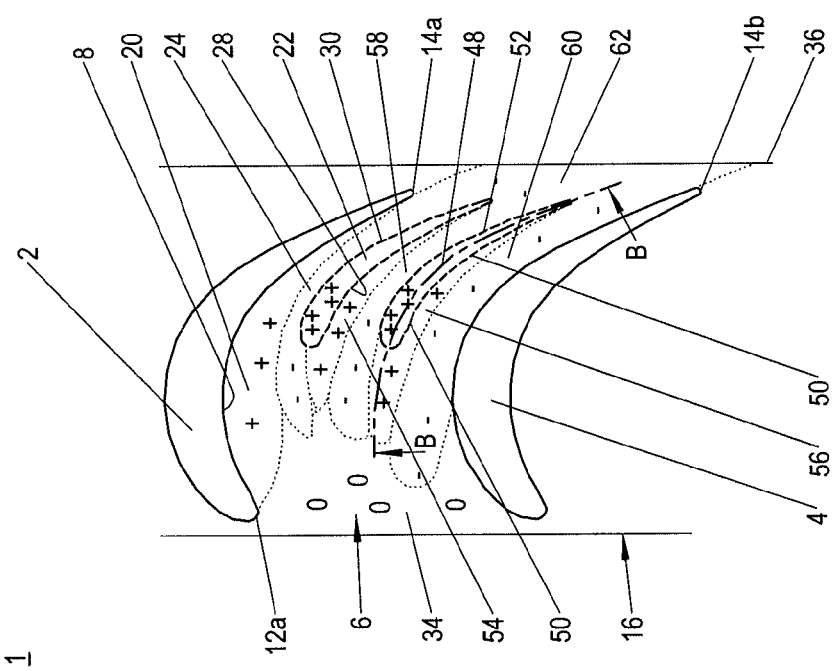

BLADE CASCADE AND CONTINUOUS-FLOW MACHINE

This application claims the priority of European Patent Application No. EP 13169056.2, filed May 24, 2013, the disclosure of which is expressly incorporated by reference herein.

BACKGROUND AND SUMMARY OF THE INVENTION

The invention relates to a blade cascade of a continuous-flow machine and a continuous-flow machine with such a blade cascade.

A primary or main flow conveyed through a flow channel is diverted by a lateral pressure gradient parallel to the boundary wall. Since wall-proximal flow layers are diverted more due to their lower speed than wall-distant flow layers, a secondary flow or a channel vortex is formed that overlies the main flow, which results in pressure loss among other things. Such secondary flows occur regularly in blade cascades of continuous-flow machines, such as gas and steam turbines. The blade cascades consist of a plurality of vanes or turbine blades arranged next to each other in a peripheral direction, which are arranged in a rotation-symmetrical flow channel and between each of which a blade channel is formed. The blade channels are each bordered in a radial direction by a radial, external, housing-side side wall and by a radial, inner, seam-side side wall. The side walls are, for example, stationary housing sections, rotor sections, radial inner blade platforms and/or radial external blade cover plates. In a peripheral direction, the blade channels are each bordered by a pressure-side and a suction-side turbine blade wall. To decrease the secondary flows, contouring in the form of elevations and/or depressions is frequently applied to the side walls. Examples of such, particularly non-periphery-symmetrical, side wall contouring are shown in European patent application EP 2 261 462 A1 and in International patent application WO 98/44240 A1.

The object of the invention is to create a blade cascade in a continuous-flow machine with a reduced secondary flow, as well as a continuous-flow machine having improved efficiency.

A blade cascade, according to the invention, of a continuous-flow machine has a plurality of blade channels, which are each bordered in the peripheral direction by a pressure side of a blade and by an opposite suction side of an adjacent blade. In the radial direction, the blade channels are each bordered by two opposite side walls. At least one side wall of the blade channels is furnished with side wall contouring. According to the invention, the side wall contouring is wave-like in the peripheral direction and has at least one elevation, at least one depression, and at least one rib that has a blade profile with a pressure side and with an opposite suction side.

The non-periphery-symmetrical side wall contouring according to the invention causes a reduction of secondary flow vortices and a decrease in deviations of an exit flow angle from the turbine cascade in the side wall-proximal region. The at least one side wall contouring allows for primary pressure gradients, particularly those pressure gradients acting in a peripheral direction, to be favorably influenced, specifically by the at least one blade profile-like rib. In addition, the at least one side wall contouring allows the exit flow angle to be influenced and adjusted by the shaping of at least one elevation running in the primary flow direction, or the main flow direction, and at least one depression running in a primary flow direction, for example, in the respective rear region of the side wall in the vicinity of the side wall in such manner that a subsequent cascade experiences a more favorable entry flow distribution and thereby less flow losses are caused. In addition, it is achieved that an interaction of horseshoe vortices, induced at the leading edge of the blade, with each other and with a channel vortex is prevented or at least reduced.

The at least one elevation and the at least one depression each relate to a non-contoured surface section of the radial inner side wall or radial external side wall. In reference to the inner side wall, the at least one elevation extends from the non-contoured surface section radially outward and thereby represents a channel constriction. The at least one depression extends from the non-contoured surface section radially inward and thus represents a channel expansion. The at least one rib can extend, similar to an elevation, beyond the non-contoured surface section. Also, the at least one rib can extend radially outward from an elevation and thus be "placed on" an elevation. However, the at least one rib can also extend out of a depression radially outward across a non-contoured surface section and thereby be partially arranged in the depression. However, the at least one rib can also extend radially outward from a depression, but not go over the non-contoured surface section and thus be arranged entirely in the depression. If the external side wall is provided with a non-symmetrical side wall contouring, the at least one elevation and the at least one rib basically extend inward and the at least one depression extends in principle radially outward.

Preferably, the side wall contouring is conducted to the downstream side wall edge and thus conducted to the rear axial gap. The downstream side wall edge is hereby also designed in a wave-like manner. In doing so, the at least one elevation, the at least one depression and/or the at least one rib can be conducted individually to the downstream side wall edge. The at least one elevation, the at least one depression and/or the at least one rib begin at the upstream side wall edge so that an upstream side wall edge can also be designed in a wave-like manner. Basically, the side wall contouring can extend beyond the leading edge and trailing edge of the blades.

The at least one elevation and/or the at least one depression can have varying amplitudes to influence the flow in the flow direction. The at least one elevation and/or the at least one depression hereby have in the flow direction various heights and depths. Preferably, the at least one elevation has a height that corresponds to a maximum of 30% of the blade pitch.

Preferably, the pressure side and the suction side of the at least one rib are oriented radially, wherein "radial" also comprises "essentially radial." "Radial" signifies in particular "steep-walled" with a deviation from the radial direction of up to ±15°. Preferably, the at least one rib has a height that corresponds to a maximum of 30% of the blade pitch.

For exit flow angle control purposes, it is advantageous if the at least one rib is in a range of 40% to 100% of an axial blade width.

To positively influence the horseshoe vortices, it is advantageous if the at least one rib is designed in a range of 0% to 60% of the axial blade width.

Preferably, the side wall contouring has rounded edges. By rounding or chamfering the edges, the formation of vortices that can induce mixing losses is prevented or at least substantially reduced. For example, the at least one rib has a flat rib surface, whose side edges or whose peripheral side edge is/are rounded off. Alternatively, the at least one rib may have rounded or spherically-shaped rib surfaces.

The at least one rib may be constructed in the front and rear, in the flow direction of the continuous-flow machine, in a continuous manner and thus transitioning smoothly into adjacent surface sections. A gentle transition between the rib and a non-contoured side wall section or a section of a periphery-symmetrical side wall contour is hereby created.

To influence the flow, it may also be advantageous if curvature radii of the side wall contouring vary.

A continuous-flow machine according to the invention has at least a blade cascade according to the invention. Due to reduced secondary flows and a simultaneously stronger orientation of the respective exit flow angle of the primary flow in a target direction without sharp edges inducing additional vortices and thus mixture losses, such a continuous-flow machine is characterized by an improved efficiency.

Preferred embodiments of the invention are explained in further detail below using highly simplified schematic illustrations.

BRIEF DESCRIPTION OF THE DRAWINGS

FIG. 6 depicts a developed peripheral section of a fourth embodiment of the blade cascade according to the invention;
and
FIG. 7 depicts a cross-section along line B-B in FIG. 6.

DETAILED DESCRIPTION OF THE DRAWINGS

Figure 1:
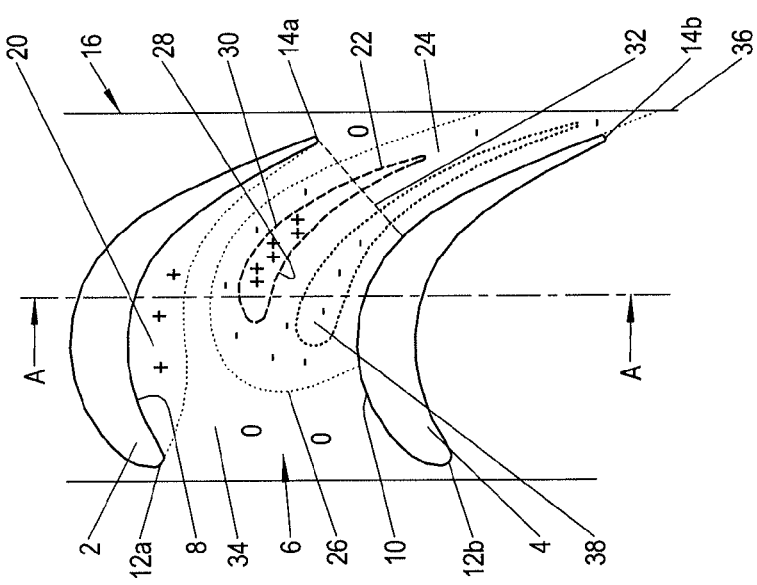
FIG. 1 depicts a developed peripheral section of a first embodiment of a blade cascade according to the invention.

FIG. 1 depicts a top view of a cross-sectional illustration of a peripheral section developed in a plane of a first blade cascade 1 according to the invention of an axial continuous-flow machine such as a stationary gas turbine or a jet engine.

Blade cascade 1 is preferably arranged on the turbine side and has a plurality of blades 2, 4 that are arranged next to each other in the flow direction of the continuous-flow machine and each border a blade channel 6, which according to the illustration in FIG. 1 has a main flow passing through it from left to right. In the peripheral direction of the continuous-flow machine or blade cascade 1, blade channel 6 is bordered by a pressure-side wall or a pressure side 8 of the first blade 2 and by an opposite suction-side wall or suction side 10 of the second blade 4, which each extend between a leading edge 12a, 12b and a trailing edge 14a, 14b of blades 2, 4. As one can see in FIG. 2, blade channel 6 is bordered in the radial direction of blade cascade 1 by a seam-side or a radial inner side wall 16. In addition, blade channel 6 is bordered in a radial direction by a housing-side or radial external side wall 18. Inner side wall 16 is formed by a rotor section or a blade platform. External side wall 18 is formed, for example, by a housing section or a blade shroud.

According to the invention, at least one of the side walls 16, 18 is furnished in the region of blade channel 6 with a non-periphery-symmetrical side wall contouring and in the peripheral direction with a wave-like side wall contouring. In the embodiment depicted in FIGS. 1 and 2, the side wall contouring indicated by the dashed line has three individual contourings 20, 22, 24 in the form of a pressure-side elevation 20, a rib 22, and a depression 24. The individual contourings 20, 22, 24 are graphically depicted by a plurality of height or depth contour lines 26 with a plus sign or a minus sign.

Elevation 20 and depression 24 each relate to a non-contoured surface section 34 of inner side wall 16 in this embodiment. Elevation 20 extends from the non-contoured surface section 34 radially outward and thus represents a channel constriction. Depression 24 extends from non-contoured surface section 34 radially inward and thus represents a channel expansion. Rib 22 extends, in relation to the inner side wall contouring, in principle radially outward.

Figure 2:
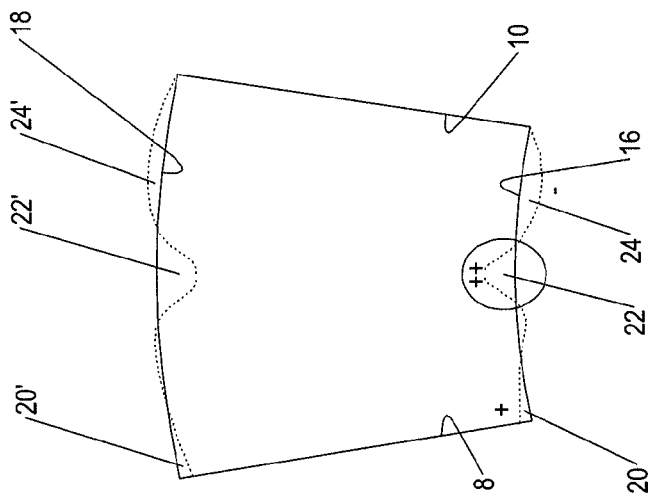
FIG. 2 depicts a cross-section along line A-A in FIG. 1.

As indicated in FIG. 2 by the dashed line in the region of the external side wall contouring, the external side wall 18 can also be furnished with a non-periphery-symmetrical and, seen in a peripheral direction, wave-like side wall contouring, which consists of a plurality of individual contourings 20', 22', 24'. The inner and outer side wall contourings may be constructed identically or differently. In addition, only the external side wall 18 can be furnished with a non-periphery-symmetrical side wall contouring. If, as indicated in FIG. 2, the external side wall 18 is furnished with a non-symmetrical side wall contouring, elevations 20' and ribs 22' basically extend radially inward and depressions 24' basically extend radially outward. Regardless, for an external side wall contouring, elevation 20' represents a channel constriction and depression 24' represents a channel expansion.

The invention is explained below by means of side wall contourings of a respective inner side wall 16.

As shown in FIG. 1, pressure-side elevation 20 extends, based on a non-contoured surface section 34 along pressure-side blade wall 8, from leading edge 12a to trailing edge 14a.

Rib 22 has a blade profile with a pressure side 28 and an opposite suction side 30. It is arranged approximately centrally between blades 2, 4 and extends out of depression 24 across the non-contoured surface section 34. It is oriented to blades 2, 4 in such a manner that pressure side 28 is opposite pressure-side blade wall 8 and suction side 30 is opposite suction-side blade wall 10. It extends in a range from 40% to 100% of an axial blade width or blade leaf width. Accordingly, it extends from about a central side wall region across a constriction 32 between blades 2, 4 out to at least an approximate axial position of the trailing edge 14a, 14b.

Depression 24 is separated from pressure-side elevation 20 across non-contoured surface section 34 of side wall 16 and extends in a peripheral direction to the suction-side blade wall 10. Depression 24 runs approximately from a region, which corresponds to 30% of the axial blade width, to rear side wall edge 36 of side wall 16.

Depression 24 has a deepest section 38, which is arranged between rib 22 and blade 4. It extends, corresponding to rib 22, in a range of 40% to 100% of the axial blade width. It has a curved, drop-like bottom surface with a downstream or rear region, which is tapered in relation to an upstream or front region.

As shown in FIG. 2, pressure-side elevation 20 is designed with a smaller amplitude in the peripheral direction than rib 22. It transitions approximately orthogonally, i.e., at an angle of 90° to the radial direction, into pressure-side blade wall 8.

Figure 3:
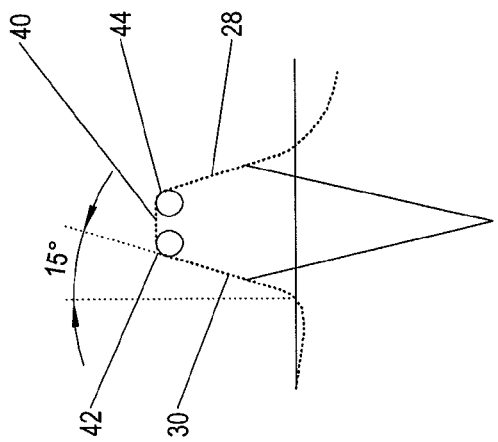
FIG. 3 depicts a detailed illustration of FIG. 2.

As shown in FIG. 3, pressure side 28 and suction side 30 of the blade profile-like rib 22 are steep-walled. "Steep-walled" means a deviation in the radial direction of preferably ±15° maximum to each other. They are connected to each other via a flat rib surface 40, which transitions via rounded-off side edges 42, 44 with the same curvature radius into the sides or flanks 28, 30 of rib 22. Preferably, the at least one rib 22 has a maximum peripheral width of 25% maximum of a blade pitch.

Figure 4:
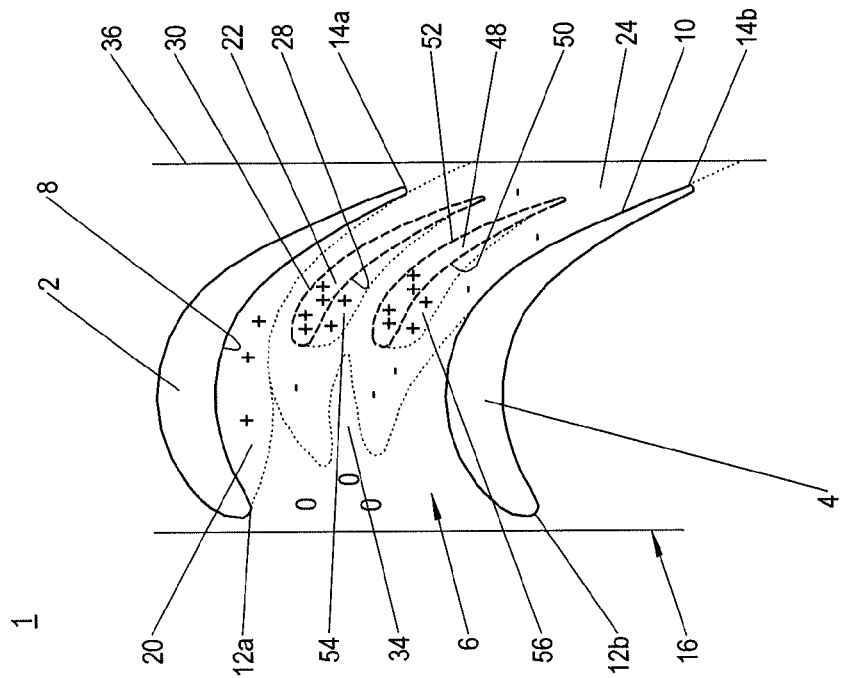
FIG. 4 depicts a developed peripheral section of a second embodiment of the blade cascade according to the invention.

FIG. 4 shows another embodiment of a side wall contouring, which is wave-like in the peripheral direction, of an inner side wall 16 in a blade channel 6 between two blades 2, 4. The side wall contouring also has a pressure-side elevation 20, a central and blade-profiled rib 22 with a pressure side 28 and a suction side 30 and a depression 24 from which rib 22 extends.

Pressure-side elevation 20 extends along a pressure-side blade wall 8 of blade 2 of a leading edge 12*a* of a blade 2 to its trailing edge 14*a*.

In contrast to the preceding embodiment according to FIG. 1, the central blade profile-like rib 22 is arranged in a range of approximately 0% to 60% of an axial blade width, so that it extends approximately from an axial position of leading edges 12*a*, 12*b* of blades 2, 4.

As another difference, depression 24 extends over the entire side wall 16 in the axial direction of blade cascade 1 from a front side wall edge 46 of side wall 16 to a rear side wall edge 36. In addition, depression 24 is not only distanced from the pressure-side elevation 20 in the peripheral direction, but also from a suction-side blade wall 10 of blade 4.

A deepest section 38 of depression 24 is also shifted forward and now begins corresponding to rib 22 in the region of the leading edges 12*a*, 12*b*. However, the deepest section 38 is conducted approximately to the axial position of trailing edges 14*a*, 14*b* and thus ends at the same axial position as the deepest section 38 of the embodiment according to FIG. 1.

Figure 5:
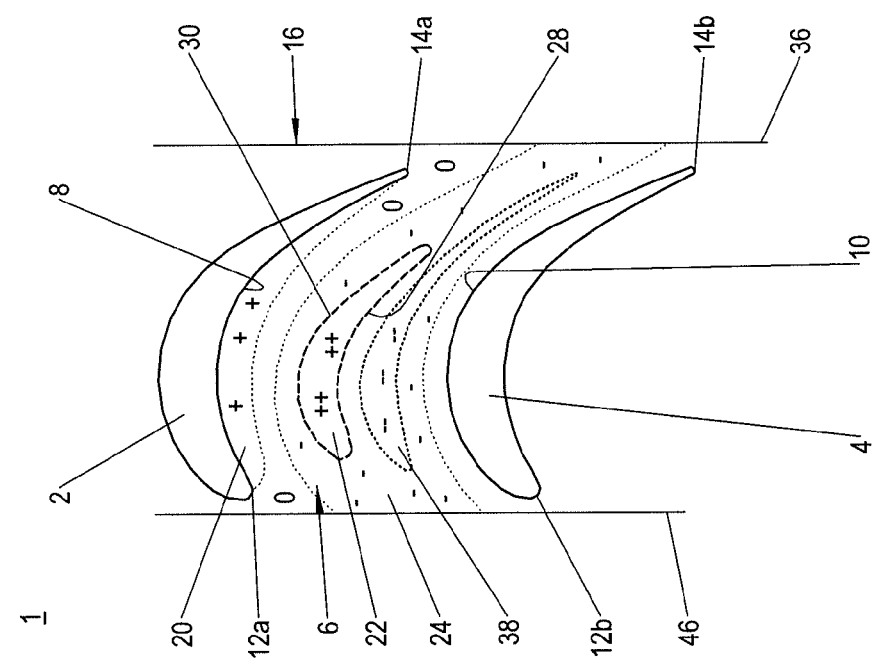
FIG. 5 depicts a developed peripheral section of a third embodiment of the blade cascade according to the invention.

FIG. 5 depicts another embodiment of a side wall contouring, which is wavy in the peripheral direction, of an inner side wall 16 in a blade channel 6 formed between two blades 2, 4, the blade channel having a pressure-side elevation 20, two blade profile-like ribs 22, 48, and a depression 24.

Pressure-side elevation 20 extends, based on the non-contoured surface section 34 along a pressure-side blade wall 8 of blade 2, from a leading edge 12*a* of blade 2 to its trailing edge 14*a*.

The blade profile-like ribs 22, 48 each extend from the depression beyond the elevation 20. They each have a pressure side 28, 50 and a suction side 30, 52, respectively. The pressure sides 28, 50 each have accordingly a concave transition region 54, 56 for example, which extends from depression 24 to the radial height of elevation 20. However, transition regions 54, 56 can also be designed differently. Preferably they extend in an infinitely variable or smooth manner from the depression bottom. Ribs 22, 48 are in a range of approximately 60% to 100% of an axial blade width, so that they extend to the axial position of the trailing edges 14*a*, 14*b* of blades 2, 4. Their widths in the peripheral direction are approximately equal. They are oriented to each other in such a manner that pressure side 28 of rib 22 is opposite suction side 52 of rib 48. In doing so, they are positioned between blades 2, 4 in such a manner that between them and at each adjacent blade wall 8, 10, there is the same peripheral distance.

Depression 24 extends in the peripheral direction from elevation 20 to suction-side blade wall 10 and in an axial direction downstream from an axial position of leading edge 12*a*, 12*b* to rear side wall edge 36 of side wall 16. Depression 24 has in the front region two individual depression sections that are formed or separated from each other by the non-contoured surface section 34 of side wall 16.

FIG. 6 depicts a wave-like side wall contouring, in a peripheral direction, of an inner side wall 16 in a blade channel 6 between two blades 2, 4 of a blade cascade 1 of a continuous-flow machine with a pressure-side elevation 20, two ribs, 22, 48, and with three depressions 24, 58, 60.

Pressure-side elevation 20 extends, based on the non-contoured surface section 34 along a pressure-side blade wall 8 of blade 2, from a leading edge 12*a* of blade 2 to its trailing edge 14*a*.

The blade profile-like ribs 22, 48 each have a pressure side 28, 50 and a suction side 30, 52, respectively. They are in a range of approximately 60% to 100% of an axial blade width, so that they extend to the axial position of trailing edges 14*a*, 14*b* of blades 2, 4. Their widths in the peripheral direction are about equal. They are positioned between blades 2, 4 in such a manner that between them and at the respective adjacent blade 2, 4, there is an identical peripheral distance. In the region of their pressure sides 28, 50, there is formed a respective transition region 54, 56 that extends smoothly from the non-contoured surface section 34 to the radial height of elevation 20 and begins, seen in the flow direction, before ribs 22, 48. Transition regions 54, 56 extend to a range of approximately 30% to 40% of the axial blade width. On the suction side, ribs 22, 48 drop off steeply into depressions 24, 58.

As depicted in FIG. 7 using cross-sectional line B-B, transition regions 54, 56 are designed to be concave. They extend continuously or smoothly from non-contoured surface section 34 and transition into a respective rib surface 40 via a rounded edge 42 indicated by a circle. The flat rib surfaces 40 in this embodiment are thereby oriented in such a manner that ribs 22, 48 have a constant radial height in the flow direction.

As indicated by reference sign 61, ribs 22, 48 can also fall off downstream via a concave transition region under the non-contoured surface section 34 and thus into depression 24 for rib 22. As indicated by a circle, ribs 22, 48 thereby also transition with their respective rib surface 40 into transition region 61 via a rounded edge 44. Seen in a flow direction, the respective amplitude of ribs 22, 48 thus varies; and specifically, the amplitudes in the depicted embodiment rise in a shallow manner, run constantly onward, and drop off gently.

As shown in FIG. 6, the first depression 24 is constructed between pressure-side elevation 20 and rib 22, and adjoins these. The second depression 58 is arranged between ribs 22, 48 and adjoins these. The third depression 60 is arranged between rib 48 and blade 4 and adjoins these. The three depressions 24, 58, 60 extend from an axial side wall region, which corresponds to about 20% to 40% of the axial blade width, downstream. In the region of blade channel 6, they are separated from each other by ribs 22, 48 or their front concave sections. Downstream from blade channel 6, depressions 24, 58, 60 go into the shared depression section 62 or form a shared depression 62, which extends from an axial position of the trailing edges 14*a*, 14*b* to the rear side wall edge 36 of side wall 16.

In all embodiments, the at least one elevation 20, 20', the at least one depression 24, 24', 58, 60, 62 and the at least one rib 22, 22', 48 can have various or identical amplitudes in the peripheral direction and in the flow direction. The amplitudes of the at least one elevation 20, the at least one depression 24, 24', 58, 60, 62 and the at least one rib 22, 22', 48 amount preferably to 30% maximum of a blade pitch.

Similarly, the width of the at least one elevation 20, 20' of the at least one depression 24, 24', 58, 60, 62 and the at least one rib 22, 22', 48 can each vary in the peripheral direction and the longitudinal direction.

In addition, the curvature radii of the waviness of the side wall contouring or side wall contourings in the peripheral direction can vary. For example, an elevation 20, 20' can have a significantly smaller curvature radius than an adjoining depression 24, 24', 58, 60, 62.

Disclosed is a blade cascade of a continuous-flow machine, whose at least one side wall in the peripheral direction is designed in a wave-like manner and has at least one elevation and at least one depression, wherein at least a profile-like rib is integrated in or combined with the side wall, the rib having a blade profile with a pressure side and with an opposite suction side, as well as a continuous-flow machine with such a blade cascade.

LIST OF REFERENCE CHARACTERS

1 Blade cascade
2 Blade
4 Blade
6 Blade channel
8 Pressure-side blade wall
10 Suction-side blade wall
12a, b Leading edge
14a, b Trailing edge
16 Inner side wall
18 External side wall
20, 20' Pressure-side elevation
22, 22' Rib
24, 24' Depression
26 Line
28 Pressure side
30 Suction side
32 Constriction
34 Non-contoured surface section
36 Rear side wall edge
38 Deepest section
40 Rib surface
42 Edge
44 Edge
46 Front side wall edge
48 Rib
50 Pressure side
52 Suction side
54 Transition region
56 Transition region
58 Depression
60 Depression
61 Transition region
62 Depression section/shared depression The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A blade cascade of a continuous-flow machine, comprising:
    a first blade and a second blade;
    a first side wall and a second side wall; and
    a blade channel, wherein the blade channel is defined in a peripheral direction by a pressure side of the first blade and by a suction side of the second blade and is defined in a radial direction by the first side wall and the second side wall;
    wherein at least one of the first side wall and the second side wall includes a side wall contouring, wherein the side wall contouring is wave-like in the peripheral direction and has an elevation, a depression, and a rib that has a blade profile with a pressure side and a suction side, wherein the elevation is a pressure side elevation which extends to a pressure-side blade wall of the first blade and starts from a leading edge of the first blade and extends to a trailing edge of the first blade, wherein the elevation has a smaller amplitude than the rib, and wherein the depression extends to a suction-side blade wall of the second blade.

2. The blade cascade according to claim 1, wherein the side wall contouring extends to a downstream side wall edge.

3. The blade cascade according to claim 1, wherein the elevation and/or the depression has a varying amplitude in a flow direction.

4. The blade cascade according to claim 1, wherein the pressure side and the suction side of the rib are oriented radially.

5. The blade cascade according to claim 4, wherein the rib has a height of 30% maximum of a blade pitch.

6. The blade cascade according to claim 1, wherein the rib is arranged in a range of approximately 40% to 100% of an axial blade width.

7. The blade cascade according to claim 1, wherein the rib is arranged in a range of approximately 0% to 60% of an axial blade width.

8. The blade cascade according to claim 1, wherein the side wall contouring has rounded edges.

9. The blade cascade according to claim 1, wherein the rib transitions, front and rear, smoothly into an adjoining surface section in a flow direction.

10. The blade cascade according to claim 1, wherein curvature radii of the side wall contouring vary.

11. A continuous-flow machine with a blade cascade according to claim 1.

* * * * *